US006930979B1

United States Patent
Sethuram

(10) Patent No.: US 6,930,979 B1
(45) Date of Patent: Aug. 16, 2005

(54) METHOD AND SYSTEM FOR MULTI-PHY ADDRESSING

(75) Inventor: Jay Sethuram, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/451,479

(22) Filed: Nov. 30, 1999

(51) Int. Cl.[7] .................................................. H04L 12/56
(52) U.S. Cl. ...................... 370/236; 231/236; 231/469
(58) Field of Search ............................ 370/230, 230.1, 370/231–236, 252, 253, 469, 229; 709/223, 224, 225, 229, 232, 234

(56) References Cited

U.S. PATENT DOCUMENTS

| | | | | |
|---|---|---|---|---|
| 5,619,499 A | * | 4/1997 | Nakabayashi | 370/468 |
| 5,748,018 A | | 5/1998 | Ishikawa | 327/154 |
| 5,784,370 A | * | 7/1998 | Rich | 370/395.1 |
| 5,854,840 A | | 12/1998 | Cannella, Jr. | 380/9 |
| 6,029,202 A | * | 2/2000 | Frazier et al. | 709/232 |
| 6,058,427 A | * | 5/2000 | Viswanath et al. | 709/231 |
| 6,141,352 A | * | 10/2000 | Gandy | 370/462 |
| 6,192,028 B1 | * | 2/2001 | Simmons et al. | 370/229 |
| 6,195,597 B1 | | 2/2001 | Yamada | 701/1 |
| 6,345,052 B1 | * | 2/2002 | Tse et al. | 370/395.6 |
| 6,356,557 B1 | | 3/2002 | Nichols et al. | 370/449 |

OTHER PUBLICATIONS

Jay Sethuram, Richard J. Weber, Chandra S. Joshi; "Method And System For Source Synchronous Clocking;" filed Nov. 29, 1999; U.S. Appl. No. 09/450,802; including Specification: pp. 1–16; Drawings: Figures 1–5 on 5 sheets.

* cited by examiner

Primary Examiner—Ricky Ngo
Assistant Examiner—Duc Duong
(74) Attorney, Agent, or Firm—Campbell Stephenson Ascolese LLP

(57) ABSTRACT

Multi-PHY addressing from source to destination in which n-number of channels or ports are used in a PHY layer device for communication with a link layer device. A single link layer to a single-PHY layer topology and a single link layer to a multi-PHY layer topology comprising multiple ports or channels receives a plurality of channels groups. Status indication signal is provided on continuous basis for the direct status for up to a predetermined number of channels.

20 Claims, 6 Drawing Sheets

METHOD AND SYSTEM FOR MULTI-PHY ADDRESSING

CROSS-REFERENCE TO RELATED APPLICATION

The subject matter of this application is related to the subject matter of co-pending U.S. Application entitled "Source Synchronous Clocking", Ser. No. 09/450,802, invented by Jay Sethuram, Richard Weber, and Chandra Shekh Joshi, and filed on Nov. 29, 1999, which is incorporated herein by reference.

BACKGROUND INFORMATION

1. Field of the Invention

The present invention relates generally to the field of telecommunication networks, and more particularly to ATM (Asynchronous Transfer Mode) interfaces between a link layer and a physical (PHY) layer.

2. Description of Related Art

Conventional communication interfaces between a link layer and a PHY layer use a polling technique for detecting incoming signal for each channel. Multiple ports and channels are coupled between the link layer and the PHY layer. Upon detecting incoming signal through one of the channels by a link layer device, the link layer device accesses the channel. Such technique establishes a master-slave type of relationship between the link layer device and the PHY layer device. Examples of conventional communication interfaces include prior Universal Test and Operation Physical Layer Protocol Interface for ATM (UTOPIA) Levels 1/2/3 interfaces.

Subsequent generation of communication interfaces may have a source synchronous clocking feature for operating at high frequencies. The polling technique of master-slave type of relationship is no longer application due to source synchronous master-slave type of relationship is no longer application due to source synchronous clocking. In source synchronous clocking, a PHY layer device transmits data when data is ready to be transmitted.

Accordingly, it is desirable to have a method and system for providing multi-PHY addressing from source to destination at high speeds between the link layer device and the PHY layer device.

SUMMARY OF THE INVENTION

The invention provides a method and system for initiating transmission in a single-PHY or multi-PHY configuration from source to destination. In either configuration, a single electrical connection provides a point-to-point transfer between a PHY layer device and a link layer device. Each PHY layer device comprises one or more ports, and each port comprises one or more channels. Each of the multiple channels or ports is assigned to a different PHY address. Multi-PHY addresses are issued from source to destination. Multi-PHY addressing method from source to destination simplifies interface by eliminating polling.

A status indication signal provides continuous indication of the flow control status for each PHY. A status indication is provided in groups of four where the first group is identified by a START signal in which subsequent groups follow sequentially during transmission. In the transmit direction, a transmit flow control signal is generated in the receive clock domain while transmit data is sent in the transmit clock domain. In the receive direction, a receive flow control signal is generated in the transmit clock domain while receive data is sent in the receive clock domain.

In source synchronous interface, data transmission can be switched to any channel or port during a clock cycle. The present invention advantageously operates with source synchronous clocking for transfer of multi-PHY addressing from source to destination. The present invention further advantageously simplifies the flow control mechanism and reduces the number of signals required of, for example, the UTOPIA Level 4 interface.

DETAILED DESCRIPTION

Figure 1A:
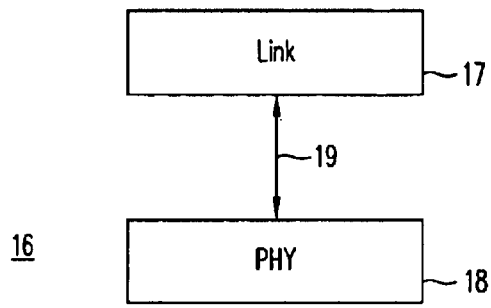
FIG. 1A is a block diagram illustrating a single-PHY configuration in accordance with the present invention.

FIG. 1A shows a block diagram of a single-PHY addressing configuration 16. In a single PHY configuration, a link layer device 17 connects to a PHY layer device 18 through a single electrical connection 19. The single-PHY addressing 16 comprises a point-to-point connection between the link layer device 17, such as a device in the ATM layer, and the PHY layer device 18.

Figure 1B:
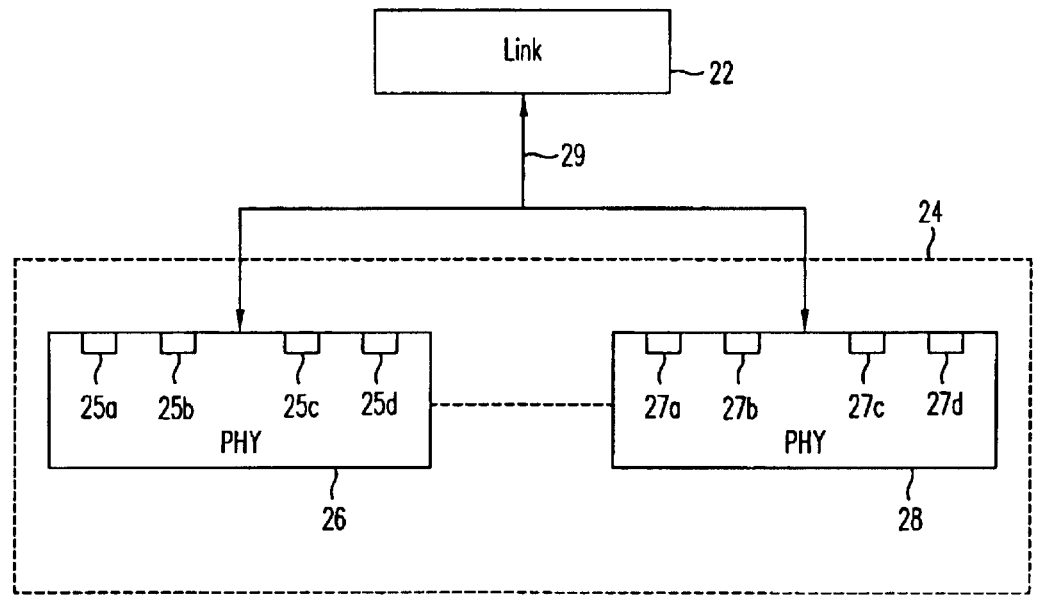
FIG. 1B is a block diagram illustrating a multi-PHY configuration in accordance with the present invention.

FIG. 1B shows a block diagram of a multi-PHY configuration 20. In the multi-PHY configuration 20, a group of PHY layer devices 24 comprise the PHY layer device 26 and 28 that connect to the link layer 22 through a single electrical interface 29. If four physical ports are used in the PHY layer device 26 or 28, then four control signals, i.e. Full[0], Full[1], Full[2], and Full[3], are needed for interfacing between the link layer device 22 and the PHY layer device 26 or 28.

Preferably, the link layer device 17 or 22 operates at a transmission rate which maintains a maximal transmission rate generated from the PHY layer device 18, 26, or 28. If transmission rate of a link layer device 17 or 22 fails to keep up with the transmission rate of the PHY layer device 18, 26, or 28, the PHY layer devices 18, 26, or 28 automatically insert idle cells or packets in data stream. Similarly, on the receive end, the link layer device 17 or 22 is preferably designed to keep up with the receive data rate in preventing a FIFO overflow in the PHY layer device 18, 26, or 28.

In either single-PHY configuration 16 or multi-PHY configuration 20, the single electrical connection 19 or 29 transfers data at high speed, typically in excess of 10 Gbps. Data types can be of any kind, including multimedia data, network data, or Internet protocol traffic. In one embodiment of the multi-PHY configuration 20, the interface comprises six bits of address to support up to 64 channels or ports in the PHY layer device 24. During a clock cycle, the data transfer can be switched from one channel to another channel in the multi-PHY configuration 20.

Each of the PHY 26 or 28 device has one or more ports. The PHY device 26 provides a port 25a, 25b, 25c, and 25d while the PHY device 28 provides a port 27a, a port 27b, a port 27c, and a port 27d. Each of the ports 25a–d and 27a–d has one or more channels for data transmission. In one embodiment, the PHY device 26 have four channels where each channel is on separate ports 25a, 25b, 25c, or 25d. In an alternate embodiment, there are a set of four channels for each of the ports 25a, 25b, 25c, and 25d. A status indication for first set of four channels are multiplexed through the port 25a, a status indication for second set of four channels are multiplexed through the port 25b, a status indication for third set of four channels are multiplexed through the port 25c, and a status indication for fourth set of four channels are multiplexed through the port 25d.

Figure 2:
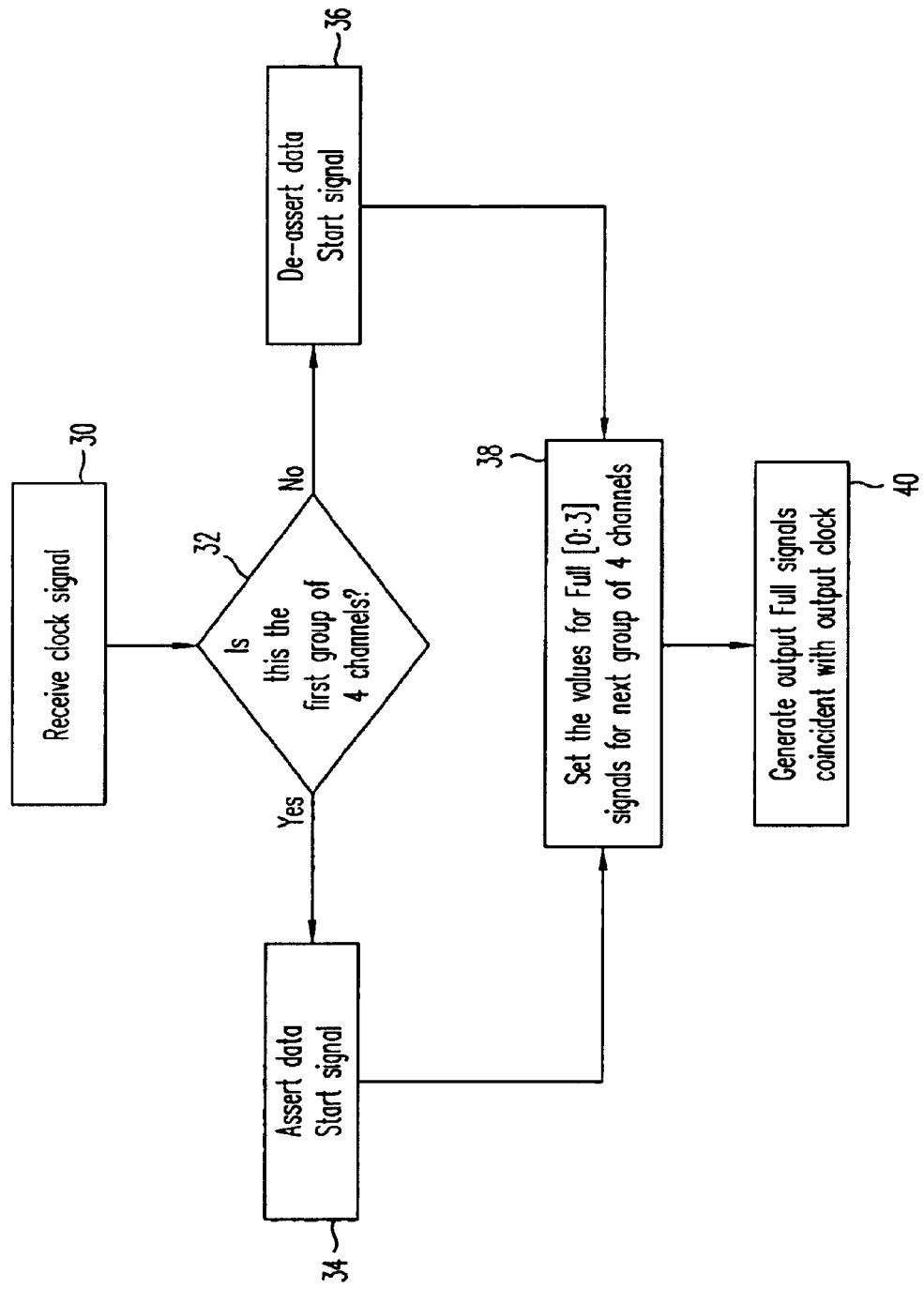
FIG. 2 is a flow diagram illustrating one embodiment in the multi-PHY address from source to destination with a direct status indication in accordance with the present invention.

FIG. 2 is a flow diagram of the multi-PHY configuration 20 with a direct status indication. The PHY layer device 26 or 28 receives 30 a transmit clock signal 41. The PHY layer device 26 or 28 determines 32 whether status indication represents a first group of four channels transmitted from the link layer device 22. If status indication represents the first group of four channels, the PHY layer device 26 or 28 asserts 34 a Start signal 42 indicating that flow control signals received from the first group of four signals. However, if the flow control indication is not from the first group of four channels, the PHY layer device 26 or 28 de-asserts 36 the Start signal 42. Whether or not the Start signal 42 is asserted or de-asserted, the PHY layer device 26 or 28 sets 38 values for flow control indications Full[0] 43, Full[1] 44, Full[2] 45, and Full[3] 46 for the next group of four channels or ports by round-robin. Each of Full[0:3] 43–46 signals indicates receiving data from the port 25a, 25b, 25c, 25d of the PHY layer device 26, or 27a, 27b, 27c, or 27d. The PHY layer device 26 or 28 generates 40 output Full [0:3] signals that are coincident with an output clock signal. signals. However, if the flow control indication is not from the first group of four channels, the PHY layer device 26 or 28 de-asserts 36 the Start signal 42. Whether or not the Start signal 42 is asserted or de-asserted, the PHY layer device 26 or 28 sets 38 values for flow control indications Full[0] 43, Full[1] 44, Full[2] 45, and Full[3] group of four channels or ports by round-robin. Each of Full[0:3] 43–46 signals indicates receiving data from the port 25a, 25b, 25c, 25d of the PHY layer device 26, or 27a, 27b, 27c, or 27d. The PHY layer device 26 or 28 generates 40 output Full [0:3] signals that are coincident with the transmit clock signal 41.

Figure 3:
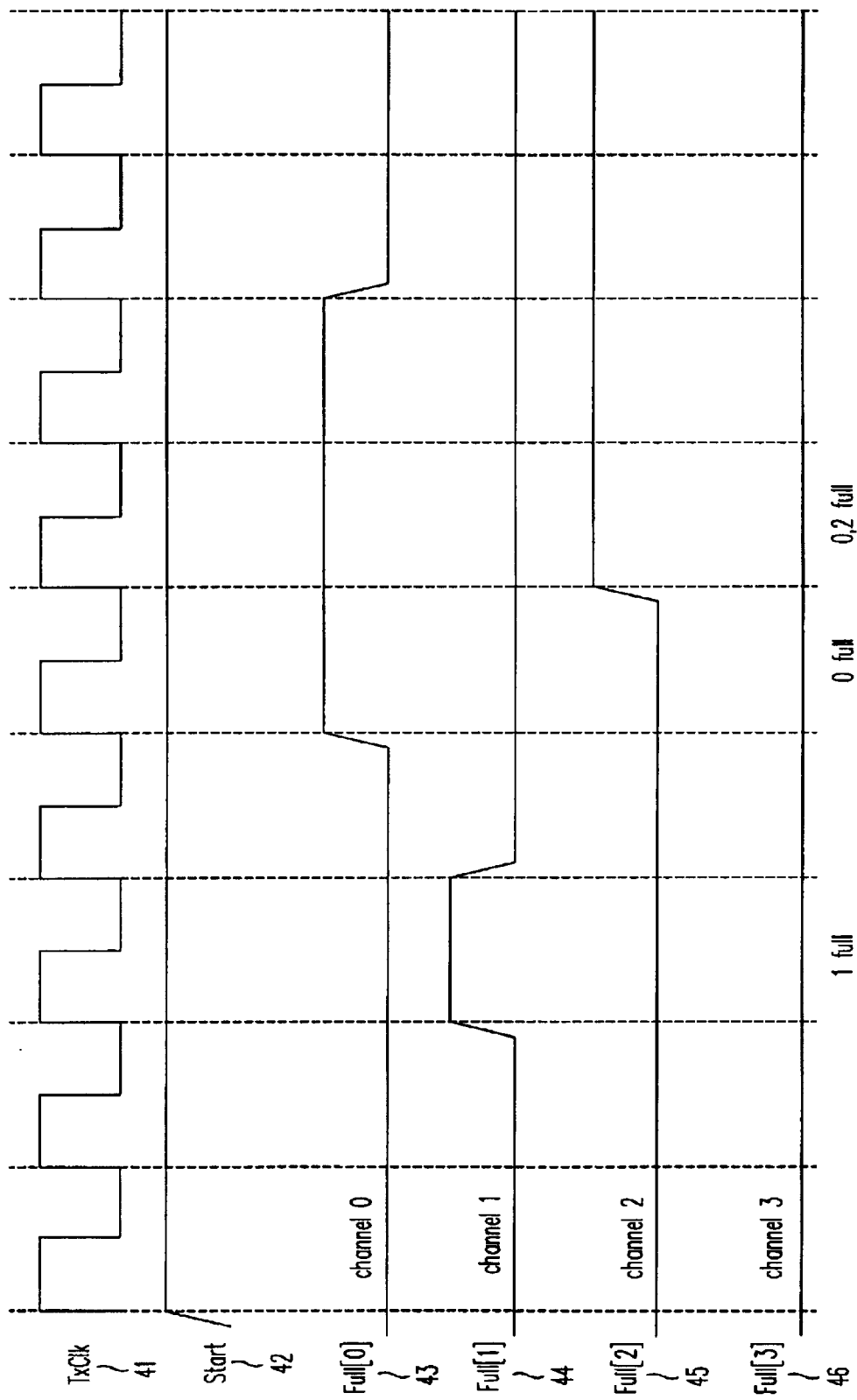
FIG. 3 is a timing diagram illustrating the first embodiment in the single-PHY mode addressing from source to destination with a direct status indication up to four PHYs in accordance with the present invention.

FIG. 3 is a timing diagram of the single-PHY interface 16 with a direct status indication, including the TxClk signal 41, the Start signal 42, and the Full[0:3] signals 43–46. The TxClk signal 41 represents is a transmit clock that the PHY device 18 uses to sample Tx signals 53–63. The link layer device 17 drives Tx signals 53–63 coincident with the rising edge of the TxClk clock signal 41. The Start signal 42 initiates a transmit flow control frame from the PHY device 18 to the link layer device 17. In this embodiment, the Start signal 42 is synchronous to RxClk for compliance with a source synchronous feature. Since four channels are used for transmission, the Start signal 42 remains valid for the entire duration without the necessity to assert, de-assert, and then assert the Start signal because there is just one group comprising four channels without the requirement for multiplexing multiple groups.

Signals Full[0–3] 43–46 correspond to receive flow control signals from channels 0, 1, 2, and 3, respectively. In the transmit direction, each of the flow control signals Full[0–3] 43–46 are received from the PHY layer 17 to the link layer 18 coincident with a RxClk. In other words, the flow control signals Full[0–3] 43–46 are received in a receive clock domain while data is transmitted in a transmit clock domain. The flow control signals Full [0:3] 43–46 indicates to a sending or source device on whether a receiving or destination device is full or not. If a receiving or destination device if full, the sending or sourcing device stops data transfer; otherwise, the sending device continues data transfer. Similarly, in the receive direction, each of the flow control signals Full[0–3] 43–46 are received from the link layer 18 to the PHY layer 17 coincident with TxClk 41. In other words, the flow control signals Full[0–3] 43–46 are received in a transmit clock domain while data is sent in a received clock domain. The flow control signals Full [0:3] 43–46 indicates to a sending or source device on whether a receiving or destination device is fill or not. If a destination device if full, the sourcing device stops data transfer, otherwise, the sending device continues data transfer.

Figure 4:
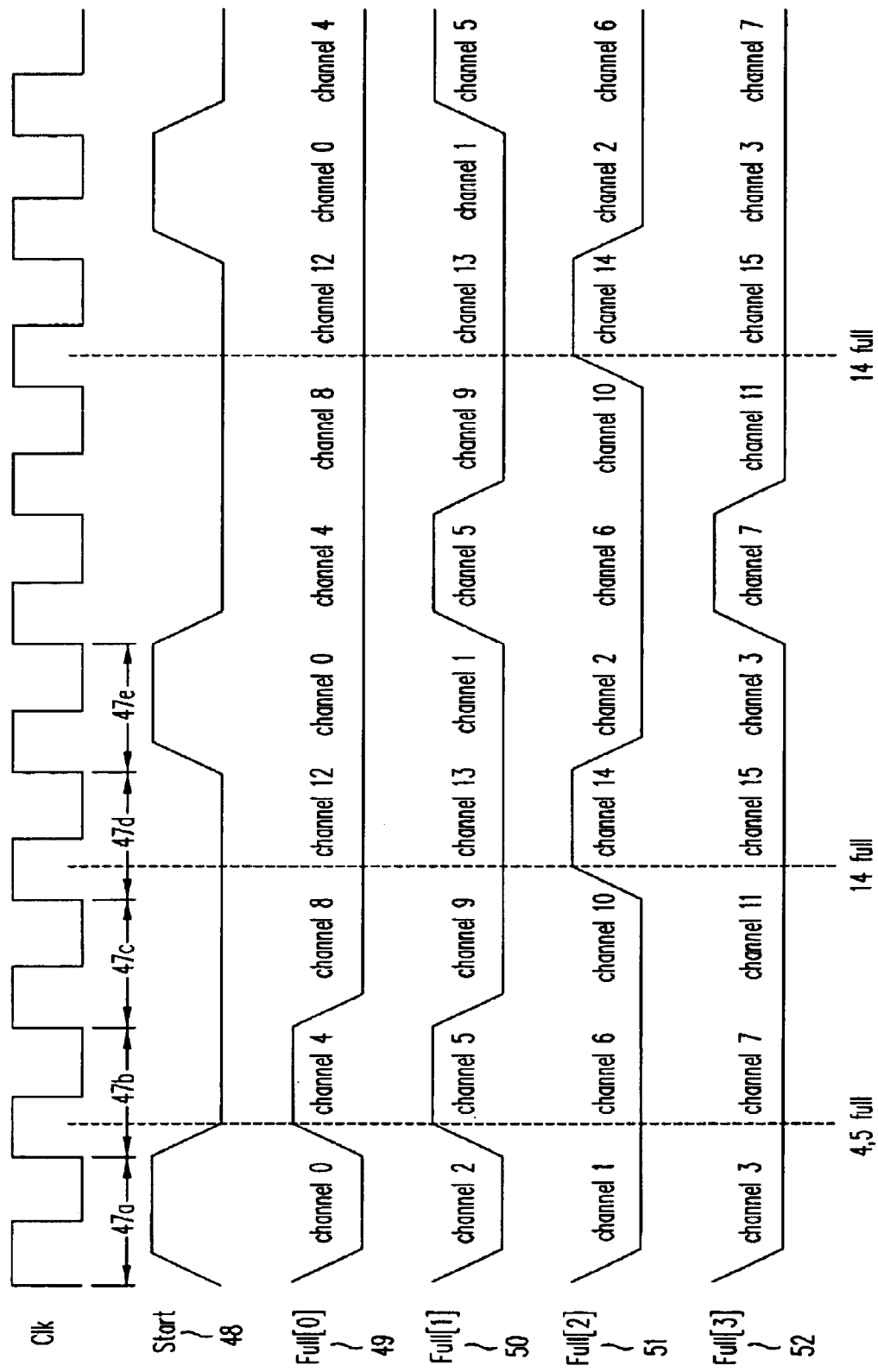
FIG. 4 is a timing diagram illustrating the second embodiment in the multi-PHY address from source to destination with a direct status indication for sixteen channels divided in a group of four channels in accordance with the present invention.

FIG. 4 shows a timing diagram of the multi-PHY address 29 with a direct status indication of flow control signals for sixteen channels divided in groups of four channels. A Start 48 and Full[0:3] signals 49–52 operate differently due to multiplexing of channels 0 through channel 15. In this embodiment, the assertion of the Start signal 48 indicates receiving flow control status information from a first group of four channels, the channels 0–3, by the PHY device 26 or 28. The Start signal 48 is de-asserted for the subsequent clock cycles. During each subsequent clock cycle, a flow control status information from a next group of four channels, channels 4–7, is received. During a first clock cycle 47a, the arrival of the first group of flow control status signals from channels 0–3, is identifiable by the assertion of the Start signal 48. When the first group of four channels, channels 0 through 3, have arrived during a first clock cycle, the Start signal 48 is asserted indicating the commencement in the reception of the flow control status indication for channels 0–3. Accordingly, the Full[0] signal 49 represents the flow control status indication for the channel 0, the Full[1] signal 49 represents to flow control indication for the channel 1, the Full[2] signal 50 represents to flow control indication for the channel 2, and the Full[3] signal 52 represents flow control indication for the channel 3. The Start signal 48 is de-asserted for receiving the flow control status indication of subsequent groups of channels in subsequent clock cycles.

During a second clock cycle 47b, the PHY device 26 or 28 receives flow control indications of the Full[0:3] signals 49–52 for channels 4 through 7. During a third clock cycle 47c, the PHY device 26 or 28 receives flow control indications Full[0:3] 49–52 from channels 8 through 11. During a fourth clock cycle 47d, the PHY device 26 or 28 receives flow control indications on the Full[0:3] 49–52 from channels 17 through 15. This round-robin sequence of operations repeats in a fifth clock cycle 47e, as once again, the Start signal 48 is asserted indicating the commencement of the first group of four channels. Although sixteen channels are illustrated in this embodiment, one of ordinary skill in the art can extend or reduce the number of channels multiplexed and adjust the timing duration of the Start signal 48 without departing from the spirit of this invention. The number of channels may be increased to receive flow control signal without increasing the number of signals for n number of channels. Flow control status information is sent back to a sending device or a source device with every clock indicating whether or not a receiving device is full or not.

Figure 5:
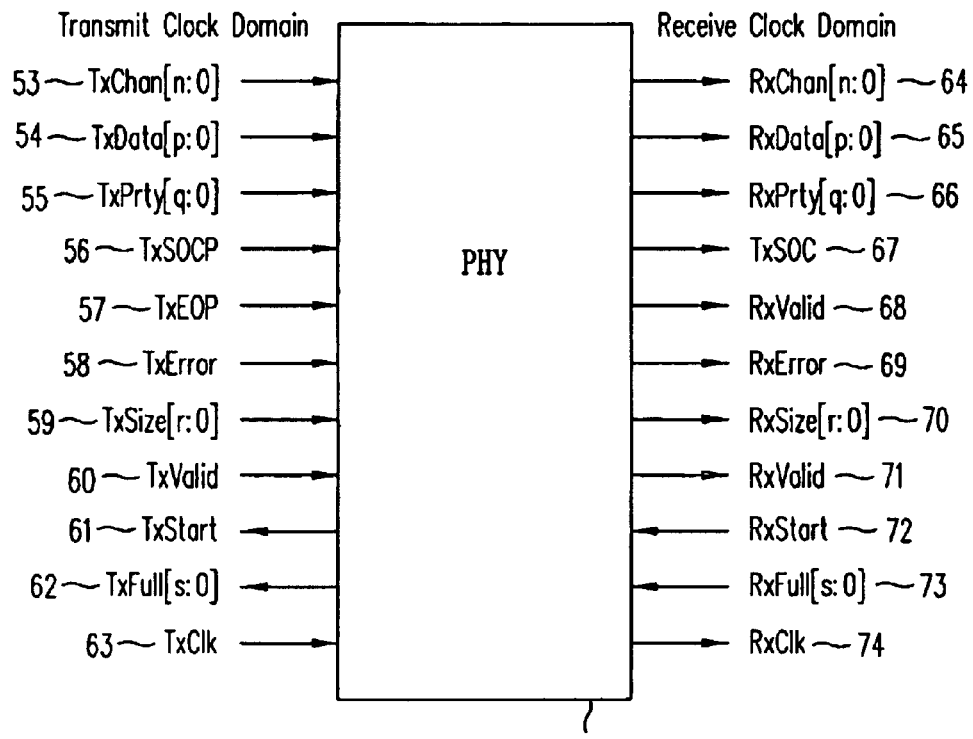
FIG. 5 is a pin diagram illustrating the pins for packet interface signals of a PHY layer device for communication with a link layer device in the present invention.

FIG. 5 shows a pin diagram for variable length packet interface signals for communication in the single-PHY configuration 16 between the PHY layer device 18 and the link layer device 17, or in the multi-PHY configuration 20 between the PHY layer device 26 or 28 and the link layer device 22. The packet interface signals contain a set of transmit signals 53–63, as described in Table 1, and a set of received signals 64–74, as described in Table 2. The pin description in Tables 1 and 2 is applicable to high-speed interface such as the UTOPIA Level 4 interface. The transmit pins 53–63 in the packet interface signals include TxChan[n:0] signals 53, TxData[p:0] signals 54, TxPrty [q:0] signals 55, a TxSOCP signal 56, a TxEOP signal 57, a TxError signal 58, TxSize[r:0] signals 59, a TxValid signal 60, a TxStart signal 61, TxFull[s:0] signals 62, and a TxClk signal 63. The transmit channel TxChan[n:0] signals 53 are required for selecting a particular channel in the multi-PHY configuration 20. However, the TxChan[n:0] signals 53 are not necessary in the single-PHY configuration 16. The transmit parity signals, TxPrty[q:0] 55, are optional and are provided for indication of transmit control and data parity. The transmit Start signal 61, TxStart, is required in a design where the number of channels is greater than four in the multi-PHY configuration 20.

The transmit error TxError signal 58 indicates whether an error has been detected during transmit, such errors including bit errors and packet errors. If a link layer or a system detects the TxError signal 58, then the system analyzes further on the type of error which caused the triggering of the TxError signal or bit 58.

In this set of transmit signals, the transmit flow control signals of TxFull[s:0] 62 are sent in the receive clock domain from PHY to link, while transmit data TxData [p:0] 54 is sent in the transmit clock domain from link to PHY. Moreover, the transmit flow control signal of TxStart 61 is transmitted in the receive clock domain from PHY to link, while transmit data, TxData [p:0] 54, is sent in the transmit clock domain from link to PHY.

TABLE 1

Packet Interface Signals - Transmit

| Signal | Direction | Function |
| --- | --- | --- |
| TxChannel [n:0] 53 | Link to PHY | TxChannel [n:0] signals transmit PHY channel. The TxChannel signals are sampled when TxValid is asserted. The TxChannel signals is set to zero when TxValid is de-asserted. The TxChannel signals determine the channel associated with the TxData, TxSOCP, TxEOP, TxError, TxSize, and TxValid signals. |
| TxData [p:0] 54 | Link to PHY | TxData [p:0] signals are used to transmit data. The TxData signals are sample when TxValid is asserted. The TxData signals is set to zero when TxValid is de-asserted. |
| TxPrty [q:0] 55 | Link to PHY | TxPrty [q:0] signals are used to transmit control and data parity. The TxPrty signals comprise correct parity. |
| TxSOCP 56 | Link to PHY | TxSOCP signal is used to transmit Start of cell or packet. The TxSOCP is sampled when TxValid is asserted. The TxSOCP signal is set to zero when TxValid is de-asserted. |
| TxEOP 57 | Link to PHY | TxEOP signal is used to transmit end of packet. The TxEOP signal is sampled when TxValid is asserted. The TxEOP signal is set to zero when TxValid is de-asserted. |
| TxError 58 | Link to PHY | TxError signal is used to transmit data error. The TxError signal is sampled when TxEOP and TxValid are both asserted. The TxError signal is set to zero at other times. |
| TxSize [r:0] 59 | Link to PHY | TxSize [r:0] are used to transmit octet count. A value of zero indicates that all octets are valid. The TxSize signals are sampled when TxEOP and TxValid are both asserted. The TxSize is set to zero at other times. |
| TxValid 60 | Link to PHY | TxValid signal is used to transmit data valid. When the TxValid is de-asserted, the following signals is driven to zero: TxChannel, TxData, TxSOCP, TxEOP, TxSize. |
| TxStart 61 | PHY to Link | TxStart signal is used to transmit flow control frame Start from the PHY device to the link layer device. Due to the source synchronous feature of the interface, the TxStart signal is synchronous to the RxClk. |
| TxFull [s:0] 62 | PHY to Link | TxFull [s:0] signals are used to transmit flow control full indication from the PHY device to the link layer device. With cells, a TxFull signal indicates that there is no room for more cells in the PHY. With packets, a TxFull signal indicates that there is no room for more words in |

TABLE 1-continued

Packet Interface Signals - Transmit

| Signal | Direction | Function |
|---|---|---|
| | | the PHY. The full status of channels is time multiplexed on to these four signals. Note that due to the source synchronous feature of the interface, the TxFull signal is synchronous with the RxClk. |
| TxClk 63 | Link to PHY | TxClk signal is used to transmit clock. The PHY device will use the TxClk to sample all the Tx signals. The link layer device will drive all the Tx Signals coincident with the rising edge of the TxClk clock. |

Correspondingly, the set of receive signals 64–74 generated from the PHY device 26 to the lind layer device 22 is described below in Table 2.

TABLE 2

Packet Interface Signals - Receive

| Signal | Direction | Function |
|---|---|---|
| RxChan [n:0] 64 | PHY to link | RxChan. [n:0] signals are used to receive PHY channel. The RxChan signals are sampled when RxValid is asserted. The RxChan signals is set to zero when RxValid is de-asserted. The RxChan signals determine the channel associated with the RxData, RxSOCP, RxEOP, RxError, RxSize, and RxValid signals. |
| RxData [p:0] 65 | PHY to link | Rx Data [p:0] signals are used to receive data. The Rx Data signals are sampled when RxValid is asserted. The Rx Data signals is set to zero when RxValid is de-asserted. |
| RxPrty [q:0] 66 | PHY to link | RxPrty [q:0] signals are used to receive control and data parity. The RxPrty comprises correct parity. |
| RxSOCP 67 | PHY to link | RxSOCP is used to receive Start of cell or packet. The RxSOCP signal is only sampled when RxValid is asserted. The RxSOCP is set to zero when RxValid is de-asserted. |
| RxEOP 68 | PHY to link | RxEOP signal is used to receive end of packet. The RxEOP signal is sampled when RxValid is asserted. The RxEOP is set to zero when RxValid is de-asserted. |
| RxError 69 | PHY to link | RxError signal is used to receive data error. The RxError signal is sampled when both RxValid and RxEOP are asserted. The RxError signal is set to zero when RxValid is de-asserted. |
| RxSize [r:0] 70 | PHY to link | RxSize [r:0] signals are used to receive octet count. A value of zero indicates that all eight octets are valid. The RxSize [r:0] signals are sampled when both RxValid and RxEOP are asserted. The RxSize [r:0] signal is set to zero at other times. |
| RxValid 71 | PHY to link | RxValid signal is used to receive data valid. When the RxValid signal is de-asserted, the following signals is set to zero: RxChan, RxData, RxSOCP, RxEOP, RxError, and RxSize. |
| RxStart 72 | link to PHY | RxStart signal is used to receive flow control frame Start signal from the link layer device to the PHY device. The RxStart signal is sometime referred to as RxFrame signal. Due to the source synchronous feature of the interface, the RxStart signals is synchronous to the TxClk. |
| RxFull [s:0] 73 | link to PHY | RxFull [s:0] signals are use to receive flow control full indication from the link layer device to the PHY layer device. With cells, the RxFull [s:0] signals indicate that there is no room for more cells in the system. With packets, the RxFull [s:0] signals indicate that there is no room for more words in the system. The full status of the channels is time multiplexed onto |

TABLE 2-continued

Packet Interface Signals - Receive

| Signal | Direction | Function |
| --- | --- | --- |
| | | the RxFull [s:0], which in one embodiment comprises four signals, as represented by RxFull [3:0]. Due to the source synchronous feature of the interface, the RxFull [s:0] signals are synchronous to the TxClk. |
| RxClk74 | PHY to link | RxClk signal is used to receive clock. This clock is used by the system device to sample all of the Rx signals. The PHY drives the RX signals coincident to the rising edge of this clock. |

Figure 6:
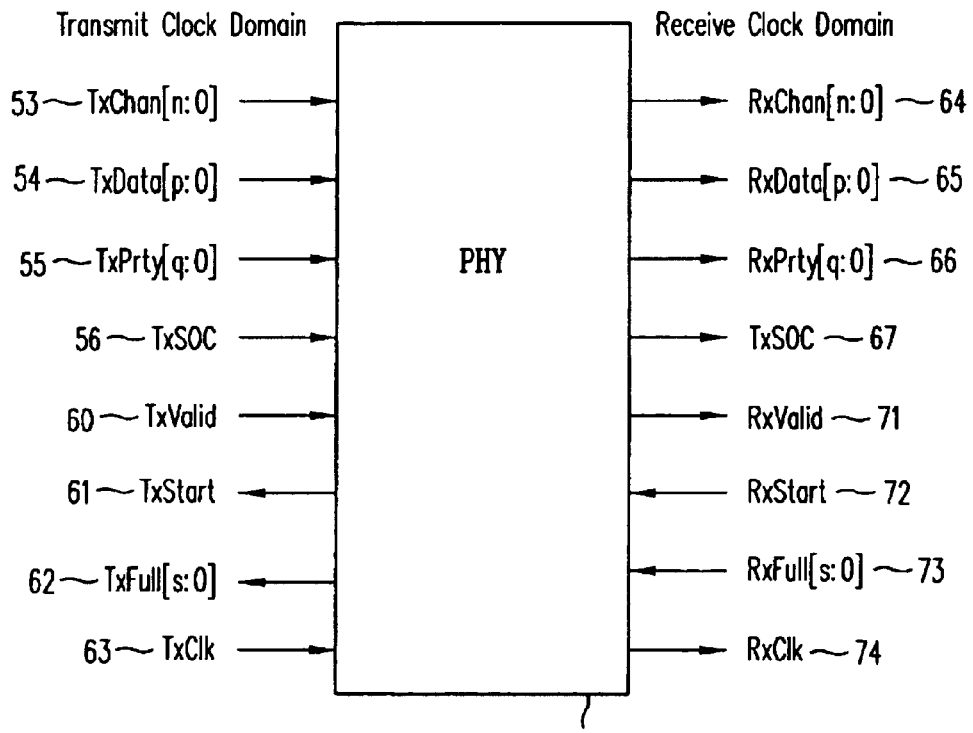
FIG. 6 is a pin diagram for fixed length ATM cell interface signals of a PHY layer device for communication with a link layer device in the present invention.

FIG. 6 shows a pin diagram for fixed length ATM cell interface signals for communication in the single-PHY configuration 16 between the PHY layer device 18 and the link layer device 17, or in the multi-PHY configuration 20 between the PHY layer device 26 or 28 and the ATM layer device 22. ATM interface signals in the PHY layer device 26 comprises a subset of pins from the packet interface signals shown in FIG. 5. In comparison to the packet interface signals, the ATM interface signals have three less signals than the packet interface signals, namely, the TxEOP signal 57, the TxError signal 58, and the TxSize[s:0] signals 59, which are not required to interface with an ATM layer device. The description of pins in the packet interface signals in Tables 1 and 2 are also applicable to the ATM.

In this set of receive signals, the receive flow control signals of RxFull[s:0] 73 are sent in the transmit clock domain from link to PHY, while receive data RxData[p:0] 65 is sent in the receive clock domain from PHY to link. Moreover, the transmit flow control signal of RxStart signal 72 is sent in the transmit clock domain from link to PHY, while receive data RxData[p:0] 65 is sent in the receive clock domain from PHY to link.

Figure 7:
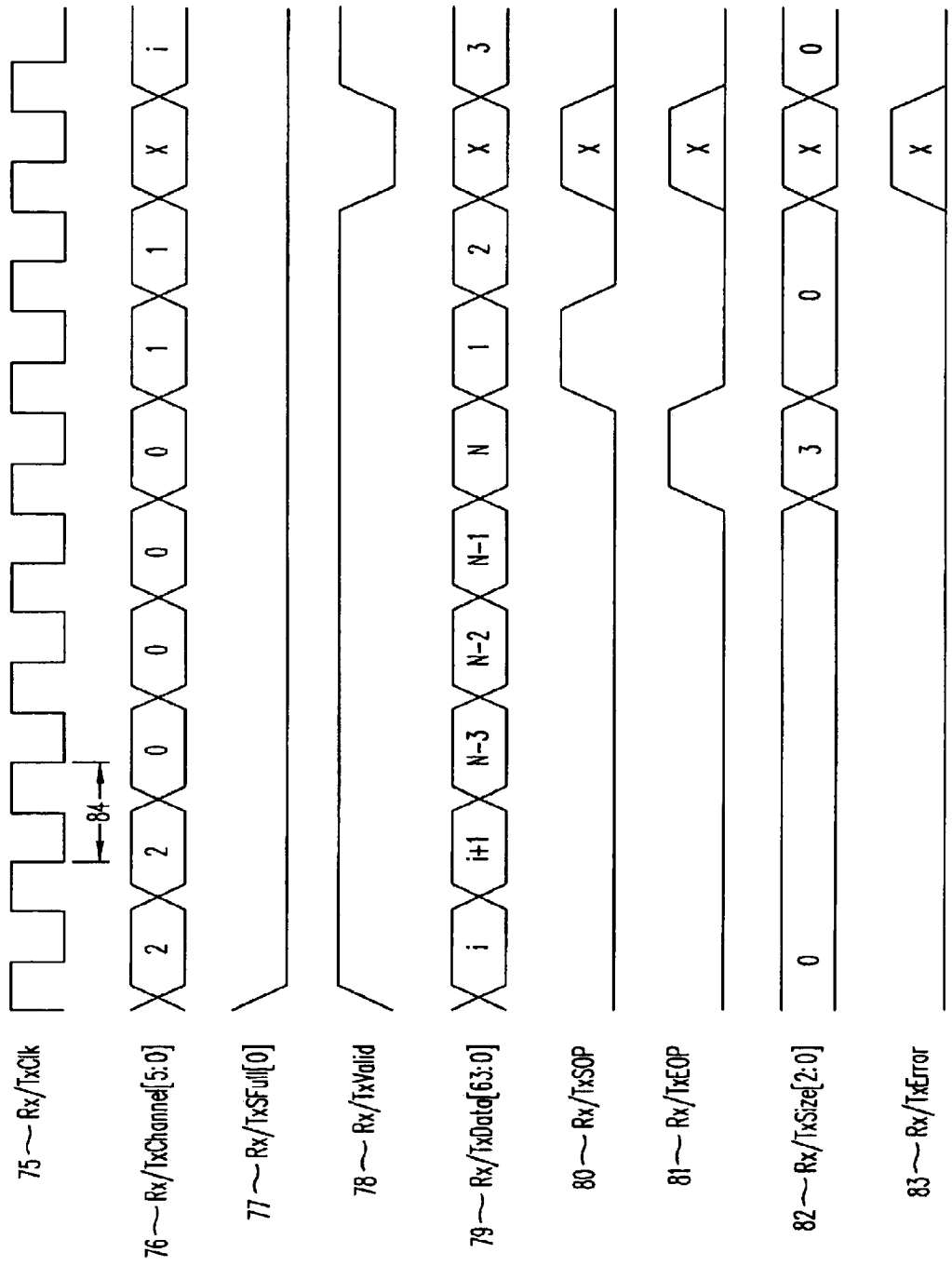
FIG. 7 is a timing diagram illustrating the transitions of the interface pins in accordance with the present invention.

FIG. 7 is a timing diagram illustrating the transitions of interface pins, including a Rx/Rx Clk signal 75, Rx/Tx Channel[5:0] signals 76, a Rx/Rx Full[0] 77, a Rx/Tx Valid 78, Rx/Tx Data[63:0] 79, a Rx/Tx SOP 80, a Rx/Tx EOP 81, Rx/Tx Size [2:0] 82, and Rx/Tx Error 83. In one embodiment, the multi-PHY configuration 20 comprises a source synchronous clocking which synchronizes data and clock signals when switching between channels. At each clock cycle, the PHY layer device 26 may switch to a different channel to transmit data. For example in FIG. 7, during a third clock cycle 84, the channel 2 is switched to the channel 0. When a Rx/Tx Valid signal 78 transitioned from valid to invalid to indicate that no information is being transmitted, data through Rx/Tx channel[5:0] 76 and Tx/Tx data [63:0] 79 comprise "don't care" states, as represented by the symbol "X". The Rx/Tx Valid signal 78 indicates whether data being transmitted is valid or not. When the Rx/Tx Valid signal 78 is valid, then data being transmitted is valid. When the Rx/Tx Valid signal 78 is invalid, then the data that is being transmitted is invalid. Therefore, a feature of the multi-PHY address from source to destination is the capability of switching from one channel to another channel during the same clock cycle, if the data is valid during that clock cycle and at that clock edge.

The above embodiments are only illustrative of the principles of this invention and are not intended to limit the invention to the particular embodiments described. For example, one having ordinary skill in the art should recognize that the pins for the packet interface signals and the ATM interface signals may be multiplexed to conserve the total pin counts on a semiconductor chip. Furthermore, one of ordinary skill in the art should recognize that the invention may be practiced within the spirit of the invention by transmitting signals from various sources including a system or a device that is equivalent to a link layer device for communication with a PHY layer device. Accordingly, various modifications, adaptations, and combinations of various features of the described embodiments can be practiced without departing from the scope of the invention as set forth in the following claims.

I claim:

1. An interface device for data transfer between a link layer device and a PHY layer device, comprising:
    at least one transmit data signal, from the link layer device to the PHY layer device, for transmitting data;
    a transmit Start of a cell or a packet signal, from the link layer device to the PHY layer device, for indicating the transmission of the cell or the packet;
    a transmit data valid signal, from the link layer device to the PHY layer device, for indicating that the transmit data is valid at a particular point in the time during the transmission;
    at least one transmit full signal, from the PHY layer device to the link layer device, for indicating that a buffer in the PHY layer device is full in which no more cells can be received; and
    a transmit clock signal, from the link layer device to the PHY layer device, for serving as a clock signal for transmitting signals including the at least one transmit data signal, the transmit Start of cell or packet signal, and the transmit data valid signal;
    wherein the interface comprises an ATM interface for communicating with ATM interface signals;
    wherein the ATM interface comprises a transmit Start signal, from the PHY layer device to the link layer device, for indicating the transmission of flow control signals for a first group of channels.

2. The interface device of claim 1, wherein the ATM interface comprises at least one transmit channel signal, from the link layer device to the PHY layer device, for determining a channel that corresponds with the transmit data signal.

3. The interface device of claim 1, wherein the ATM interface comprises a transmit parity signal, from the link layer device to the PHY layer device, for control of the parity of the data.

4. A method for sending flow control signals from a link layer device to one or more PHY layer device in a transmit direction, comprising the steps of:
    sending data from a link layer device to a PHY layer device in one or more PHY layer devices in a transmit clock domain;

receiving one or more flow control signal from the one or more PHY layer device to the link layer device in a receive clock domain coincident to a receive clock, the one or more flow control signal indicating if the PHY layer device is full;

where the one or more PHY layer device comprises one or more ports, the one or more ports comprises one or more channels; wherein the one or more flow control signals comprises a transmit Start signal, the transmit Start signal indicating receiving flow control from a first group of channels; wherein the first group of channels being transmitted through a port or multiple ports in the PHY layer device; and wherein the one or more flow control signal comprises a plurality of Full signals, each Full signal corresponding to a respective channel in the first group of channels.

5. The method of claim 4, further comprising the step of connecting the PHY layer device with the link layer device through a single electrical connection.

6. The method of claim 4, further comprising the step of receiving a second group of channels, each Full signal corresponding to a respective channel in the second group of channels.

7. An interface device for data transfer between a link layer device and a PHY layer device, comprising:

at least one transmit data signal, from the link layer device to the PHY layer device, for transmitting data;

a transmit Start of a cell or a packet signal, from the link layer device to the PHY layer device, for indicating the transmission of the cell or the packet;

a transmit data valid signal, from the link layer device to the PHY layer device, for indicating that the transmit data is valid at a particular point in the time during the transmission;

at least one transmit full signal, from the PHY layer device to the link layer device, for indicating that a buffer in the PHY layer device is full in which no more cells can be received; and a transmit clock signal, from the link layer device to the PHY layer device, for serving as a clock signal for transmitting signals including the at least one transmit data signal, the transmit Start of cell or packet signal, and the transmit data valid signal;

wherein the interface comprises a packet interface device, the packet interface device further comprising:

a transmit end of packet signal, from the link layer device to the PHY layer device, for indicating that the end of the packet has occurred;

a transmit data error signal, from the link layer to the PHY layer device, for indicating that an error during the transmission has occurred; and at least one transmit size signal, from the link layer device to the PHY layer device, for counting a number of valid octets in a last transfer.

8. The interface device of claim 7, wherein the interface comprises an ATM interface for communicating with ATM interface signals.

9. The interface device of claim 7, wherein the packet interface device comprises at least one transmit channel flow control signal, from the PHY layer device to the link layer device, for determining a channel that corresponds with the transmit data signal.

10. The interface device of claim 7, where in the packet interface device comprises a transmit parity signal, from the link layer device to the PHY layer device, for control of parity of the data.

11. An interface device for data transfer between a link layer device and a PHY layer device, comprising:

at least one receive data signal, from the PHY layer device to the link layer device, for receiving data;

a receive Start of a cell or a packet signal, from the PHY layer device to the link layer device, for indicating the reception of the cell or the packet;

a receive data valid signal, from the PHY layer device to the link layer device, for indicating that the receive data is valid at a particular point in time during the transmission;

at least one receive full signal, from the link layer device to the PHY layer device, for indicating that a buffer in the link layer device is full in which no more cells can be received; and a receive clock signal, from the PHY layer device to the link layer device, for serving as a clock signal for receiving signals including the at least one receive data signal, the receive Start of cell signal, and the receive data valid signal.

wherein the interface comprises a packet interface device, the packet interface device further comprising:

a receive end of packet signal, from the link layer device to the PHY layer device, for indicating that the end of the packet has occurred;

a receive data error signal, from the link layer to the PHY layer device, for indicating that an error during the transmission has occurred; and at least one receive size signal, from the link layer device to the PHY layer device, for counting a number of octets.

12. The interface device of claim 11, wherein the interface comprises an ATM interface communicating with ATM interface signals.

13. The interface device of claim 12, wherein the ATM interface, comprising at least one receive channel signal, from the link layer device to the PHY layer device, for determining a channel that corresponds with the receive data signal.

14. The interface device of claim 12, wherein the ATM interface comprises a receive Start signal, from the PHY layer device to the link layer device, for indicating the transmission of a flow control status for a first group of ports.

15. The interface device of claim 11, wherein the ATM interface comprises a receive parity signal, from the link layer device to the PHY layer device, for control of the parity of the data.

16. The interface device of claim 11, wherein the packet interface device comprises at least one receive channel signal, from the link layer device to the PHY layer device, for determining a channel that corresponds with the receive data signal.

17. The interface device of claim 11, wherein the packet interface device comprises a receive parity signal, from the link layer device to the PHY layer device, for control of the parity of the data.

18. A method for sending flow control signals from one or more PHY layer device to a link layer device in a receive direction, comprising the steps of:

sending data from a PHY layer device in one or more PHY layer device to a link layer device in a receive clock domain;

receiving one or more flow control signals from the link layer device to the one or more PHY layer devices in a transmit clock domain coincident to a transmit clock, the one or more flow control signals indicating if the link layer device is full;

wherein each of the one or more PHY layer devices comprises one or more ports, wherein each of the one or more ports comprises one or more channels;

wherein the one or more flow control signals comprises a receive Start signal, the receive Start signal indicating receiving flow control from a first group of channels;

wherein the first group of channels being transmitted through a port or multiple ports in the PHY layer device of the one or more PHY layer device; and wherein the one or more flow control signal comprises a plurality of Full signals, each Full signal corresponding to a respective channel in the first group of channels.

19. The method of claim 18, further comprising the step of receiving flow control from a second group of channels, each Full signal corresponding to a respective channel in the second group of channels.

20. The method of claim 19, further comprising the step of connecting the PHY layer device with the link layer device through a single electrical connection.

* * * * *

UNITED STATES PATENT AND TRADEMARK OFFICE
CERTIFICATE OF CORRECTION

PATENT NO.     : 6,930,979 B1                                                Page 1 of 1
DATED          : August 16, 2005
INVENTOR(S)    : Jay Sethuram, Richard J. Weber and Chandra S. Joshi It is certified that error appears in the above-identified patent and that said Letters Patent is hereby corrected as shown below:

Title page,
Item [75], Inventors, the following should be added:
-- Richard J. Weber, Mountain View, CA (US) and Chandra S. Joshi, Saratoga, CA (US) --.

Signed and Sealed this

Fourth Day of October, 2005

JON W. DUDAS
*Director of the United States Patent and Trademark Office*